Jan. 22, 1946.   W. W. DE LANEY ET AL   2,393,298
RUBBER GLOVE AND LIKE ARTICLE
Filed April 15, 1938

Patented Jan. 22, 1946

2,393,298

UNITED STATES PATENT OFFICE 2,393,298

RUBBER GLOVE AND LIKE ARTICLE

Wallace W. De Laney and Cornelius J. Crowley, New Haven, Conn., assignors, by mesne assignments, to The Seamless Rubber Company, New Haven, Conn., a corporation of Connecticut Application April 15, 1938, Serial No. 202,201

20 Claims. (Cl. 2—168)

This invention relates to rubber gloves such as used for household and other purposes.

The invention pertains more especially to gloves made of rubber latex. Such gloves are generally recognized as superior in many respects to those made of rubber cement, but the latex glove has a serious disadvantage in that, due to its high rubber content, its outer surface when wet is extraordinarily slippery. It has been attempted to overcome this drawback by crinkling the surfaces of the gloves, which may be accomplished, at least to a certain degree, by steps including the use of a suitable vulcanizing medium, followed by the swelling of the skin of the rubber prior to complete vulcanization. In our experience, however, such treatment of the rubber has not produced satisfactory results. The crinkling of the rubber in this manner produces valleys in the surface of the rubber. These valleys are quite irregular or tortuous, but even so we find the valley or furrow form of roughening unsuitable for bringing about a non-slipping grip on articles when the gloves are wet. In our experience also it has been extremely difficult, if not impossible, to obtain uniform roughening of gloves of different batches, where the gloves were roughened by prior processes.

One of the objects of our invention is to provide a rubber glove, and more particularly a latex glove, having an improved external surface.

Another object is to overcome the disadvantages above mentioned by providing a glove having a satisfactory roughened or non-slipping surface while retaining the flexible character of the glove and enabling the same to be of light weight and very comfortable to the user.

Figure 1:
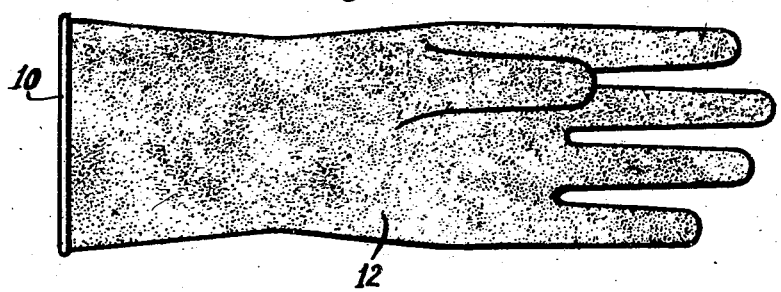
Fig. 1 is an elevation of a rubber glove made in accordance with our invention.
Figure 2:
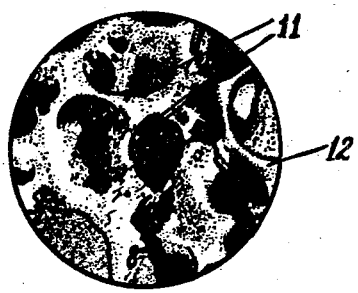
Fig. 2 shows the appearance of the outer roughened surface of the glove under the microscope.
Figure 3:
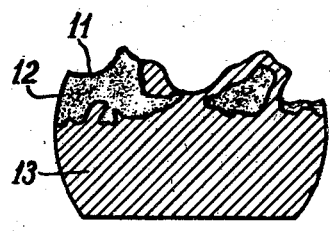
Fig. 3 is a microscopic sectional view of the glove's wall.

In the form of the invention selected for illustration, the entire exterior surface of the glove, except for the usual bead 10 at the wrist, is roughened so as to provide a non-slipping surface. The character of this surface will be apparent from Figs. 2 and 3, which show the same as viewed under the microscope, the article being magnified approximately 25 diameters in Fig. 2 and approximately 65 diameters in Fig. 3. We have discovered that a very satisfactory surface for rubber gloves, and particularly latex gloves, is created by providing the exterior surface with fine cavities or depressions in the nature of minute, closely associated pits, open cells, or cups. These pits or cups preferably should not be in excess of .032 of an inch in diameter, and they are of different diameters, and yet under the circumstances remarkably uniform in diameter, and moreover, they are very closely grouped together so that at no point on the glove surface to be roughened are such pits or cups absent. In the form illustrated there are approximately 1200 pits or pockets to the square inch. Moreover, in addition to the fact that these pits are closely grouped, they provide an outer layer very open in effect, which may be compared to lace, and which is open from the outer surface substantially to an under layer, over which the lace-like layer extends. According to the practice which we prefer for the best all-around results, bearing in mind the durability of the glove wall, as well as the best non-slipping effect, the cells or pits such as shown at 11 in Fig. 2 are of a diameter of the order of 500 microns. It will be noted, moreover, that as viewed under the microscope, the edges of these pits are somewhat broken or ragged as a result of what seems to be an effect of explosion of gas in the process hereinafter described.

Under the cellular portion or layer 12 of the glove wall, which is at the exterior of the glove, the wall has a solid portion 13 of rubber latex integrally joined to the cellular portion. It will be noted that in the process of manufacture as hereinafter described, the solid portion 13 is provided by superimposing one layer of rubber latex on another.

In making a glove such as described, the preferred procedure involves the dipping of a form into a dispersion of latex compound containing, for example, the following ingredients by dry weight:

| | Parts |
|---|---|
| Rubber (as 62% latex) | 100 |
| Sulphur | 1 |
| Zinc oxide | 3 |
| Accelerator | ¾ |
| Anti-oxidant | ½ |
| Lithophone | 10 |
| Color | 1 |
| Glue | 1 |

It is preferred to disperse all of the ingredients except the latex in a water medium, the glue (for example) being used as a dispersing agent, and the dispersion then added to the latex; but various changes can be made in this respect.

After dipping the form in this dispersion (which is relatively thin so as to run easily), the rubber-coated form is dipped in a tank containing a liquid coagulating and drying agent. This coagulating bath may comprise, for example, one part of acetic acid, one part of acetone, and one part of alcohol. These particular proportions are given merely by way of example, and it will be understood that the proportions will require changing from time to time if there is change in drying conditions. After the form is withdrawn from the coagulant tank, the coating of rubber thereon is permitted to stand and dry for a short time, say, a few minutes, after which the form is given a second coat of latex by dipping it into a second tank containing preferably a latex dispersion identical with that above described, it being understood that this second latex layer is laid on a first layer in the process of coagulation under the action of the adhering coagulant.

The form is then withdrawn from the second latex dispersion, and after a short wait, say, a few minutes, is dipped in an aerated latex dispersion contained in a suitable tank. In the tank in which this last dispersion or bath is contained, suitable agitating and aerating means are provided for bringing about and facilitating the production of minute bubbles in this liquid (which is also quite thin so as to run easily). For this purpose of agitating and aerating, we prefer to place in the last-mentioned tank a stirrer of appropriate type, and this produces a liquid or foam containing throughout its entire body closely grouped minute bubbles or air cells.

After dipping in this liquid, the form is withdrawn and turned right side up, so that the fingers are uppermost, and there is a short wait, say, of one or two minutes' duration, during which the following phenomena occur. First, the trapped air within the soft rubber escapes, and the beginning of this is noted almost immediately at the tips of the fingers, where the surface of the rubber opens up, with a change of appearance, accompanying what is apparently a bursting of bubbles of air within the rubber. This operation proceeds very rapidly, the opening up of the surface moving from the tips of the fingers over the remaining area of the glove. During this part of the process, as the entrapped air escapes from the outer surface (which phenomenon may be due to the coagulant advancing through the second dip, and continuing on through the aerated or cellular dip), there is created a movement of the latex at the surface which, coupled with the movement of draining or running (since the latex is not as yet coagulated) forms large drops on the surface comparable in form to those of a momentary spray of water upon a pane of glass. These large drops are at this stage pretty well distributed over the entire surface of the glove.

At this stage of the process the dipped form is washed by being sprayed with water. The effect of this water is to remove the drops referred to above and leave the glove with a clear, clean surface. The next step is to spray the dipped form with a coagulant for setting the rubber. The coagulant bath may comprise the usual coagulating ingredients. The glove is then dried, for example by exposing it to warm air for a suitable period. After this the glove can be rolled to form the bead 10, vulcanized, and stripped from the form, all in the customary or any preferred manner.

In some cases the roughened surface on the exterior of the glove may be provided only over the fingers and a part of the thumb and a part of the palm and knuckle portion of the glove, the remainder of the exterior surface being left smooth.

We do not limit ourselves to a process in which the form is given two dips of solid latex as distinguished from the aerated or cellular latex, as variation may be made in this respect. It is also possible by our invention to provide a glove of very attractive appearance by providing dips of different colors, for example, by having the aerated or "cellular" dip of a contrasting color. It is understood that under these circumstances, while the layers flow together, there is at the zone of juncture a definite demarcation of color. Owing to the thinness of the cellular layer or coat and the fact that it is of such open or lacy character, there is usually visible through this coat (if there is sufficient color contrast) the underlying coat of solid latex, and this provides a rubber glove having an especially attractive appearance, this latter being due in part to the effect of color gradation which is produced in this manner.

The improved glove has an exterior surface with a very agreeable "feel" resembling that of a textile fabric. The open cells at the exterior provide a most satisfactory non-slipping surface. It is believed to be of importance that a number of minute separate voids are provided which are shut off from each other. In other words, they are of rounded and closed conformation, forming pits which it is believed act to an extent as minute vacuum cups. By providing such a surface as herein described, there is created such a "cling" of the hand to the object handled as is necessary to prevent slipping or dropping.

The finished glove is quite thin, having, for example, a wall thickness of the order of .016". As the outer layer is of such light and open texture, it does not appreciably add to the weight or thickness of the glove wall. Bearing in mind that the glove is a latex glove, its very flexible character will be well understood. It is of light weight and comfortable to the wearer, owing to the fact that it exerts less tension or pull on the hand than would be the case if the outer layer were not of cellular character, while nevertheless at the same time the outer layer has considerable effect in increasing the strength and durability of the glove wall. While the glove wall contains a certain amount of entrapped air in the outer layer, the amount of this is reduced to a minimum, being of the order of 6%, and usually in any case much less than 15% of the volume of the outer layer.

In the example above described, vulcanization is effected by adding sulphur and an accelerator to the latex compound, and heating the glove for drying purposes, but we do not limit ourselves to this procedure, as vulcanization can be effected in any of the various ways common in the art.

The latex used is preferably the ordinary latex of commerce, having about 60% of solids, but variation may be made in this respect, and we may, if desired, use natural, purified, concentrated, or partially coagulated or stabilized latex, as conditions may require, and we may in some cases use a latex which is vulcanized, or partially vulcanized.

By our process, as above described, the production of a very satisfactory glove or like article can be accomplished within a remarkably short period of time. For saving time artificial coagulation is preferred, but it will be understood that this is not necessary in all cases. Different compounding ingredients may be used with the latex, as will be apparent to those skilled in the art. We believe that glue is a desirable ingredient of the rubber dip, as it makes the liquid sufficiently heavy for good dipping conditions, and at the same time prevents the formation of blisters, while on the other hand in no manner interfering with the formation of the minute air cells in the outer layer.

There is, of course, no necessity of using a hydrocarbon solvent, as in a cement dipping process, and this is a feature of advantage as regards cost, and it is understood, of course, that one of the many advantages of a latex glove over a rubber cement glove is the absence of a strong rubbery odor.

Whereas dipping is the procedure preferably employed, the improved glove can be made, if desired, by spraying, brushing, electro-deposition, coagulation, or like processes.

In our process it is a distinct advantage that vulcanization can be effected by incorporating in the bath a suitable vulcanizing agent or agents, and using a moderate amount of heat at a later stage, such heat also having a drying effect. Although it is possible to use chemical vapors for vulcanizing, this is not preferred, and, in fact, it is a matter of advantage that it can be dispensed with.

We prefer to have the pitted surface extend continuously and uniformly over the entire surface of the glove or a substantial portion thereof, but it is not necessary in all cases to remove the large drops of material that continue to adhere to the surface after the waiting period above mentioned has elapsed. We may spray the article with the coagulant without removing these drops, in which case the glove will have drop-like excrescences where the drops have been solidified. Such a glove we find quite satisfactory for some uses, e. g., for painting and work of a similar character where additional roughening of the glove surface is unobjectionable, or, in fact, desirable. In such case the pits or open cells fill the spaces between the bumps or excrescences. The new form of surface roughening may be found to be of advantage in other latex products besides gloves.

Various other changes can be made in the details without departing from the principles of our invention, and the scope of the annexed claims.

The novel process is claimed in our divisional application, Serial No. 386,468, filed April 2, 1941.

What we claim is:

1. A rubber glove having its outer surface roughened by providing therein a multiplicity of minute cavities of rounded conformation.

2. A latex glove having at its exterior surface a multiplicity of closely grouped minute open pits.

3. A rubber glove having irregularly shaped but generally round pockets at its surface, the greater part of said pockets having a diameter of less than 800 microns.

4. A rubber glove having a solid inner layer and a cellular outer layer constituting a surface roughening for the inner layer presenting a multiplicity of cells open at the outer surface of the glove.

5. A rubber glove having a solid inner layer and a cellular outer layer constituting a surface roughening for the inner layer presenting a multiplicity of cells open at the outer surface of the glove, the cells being close together and the second layer so open as to present a lacy structure.

6. A glove formed of rubber latex and having a solid inner layer and a thin open outer layer with a multiplicity of closely grouped minute open cells or pits.

7. A rubber glove having a solid inner layer and a cellular outer layer constituting a surface roughening for the inner layer presenting a multiplicity of cells closely grouped and open at the outer surface of the glove to roughen it, the outer layer containing entrapped air but said air comprising less than 15% of the volume of the layer.

8. A rubber glove comprising an inner layer of one color and a pitted outer layer of another color through whose pits the first color shows.

9. A rubber glove comprising an inner layer of one color and a pitted outer layer of another color through which the first color shows, said second layer having closely grouped open cells or pits imparting to it a lacy character.

10. A latex glove whose wall has an impervious inner layer and an outer layer of pervious cellular texture integral with the first layer and presenting open cells at the outer surface of the glove which cells extend from the outer surface substantially to the inner layer, the number of said cells being in excess of 900 to the square inch.

11. A latex product whose wall has an impervious layer and a layer of lacy character interflowed with the first layer and presenting closely grouped minute open cells.

12. A latex product whose wall has an impervious layer and a thin surface roughening layer of pervious cellular structure interflowed with the first layer and presenting open cells at its outer surface, the number of said cells being in excess of 500 to the square inch.

13. A latex glove having its surface roughened by the provision of a multiplicity of fine closely grouped shallow pits having irregular broken edges.

14. A rubber glove having a surface configuration characteristic of a collapsed and vulcanized foam, the surface having a deposit tracing the outline of the individual bubbles of the foam.

15. A rubber glove having a surface roughening comprising a multiplicity of closely grouped explosion craters.

16. A rubber glove comprising an imperforate glove body having integrally attached to at least a portion of its exposed surface a coating layer of porous latex rubber providing a rough, non-slip surface.

17. A vulcanized rubber article comprising a shaped body of imperforate rubber having integrally attached to at least a portion of its exposed surface a coating layer of porous latex rubber providing a rough surface.

18. A vulcanized composite latex product formed by dipping and having a thickness of impervious latex and thickness of foamed latex, integrally combined.

19. A hollow-shaped vulcanized seamless composite latex product formed by dipping and having a thickness of impervious latex and a thickness of foamed latex, integrally combined.

20. A hollow-shaped vulcanized composite latex product formed by dipping and having alternate thicknesses of impervious latex and of foamed latex, a thickness of the foamed latex being at one surface and a thickness of the impervious latex being at the other surface, said article being reversibly constructed so that for use either the impervious surface or the foamed surface may constitute the outer surface of the article.

WALLACE W. DE LANEY.
CORNELIUS J. CROWLEY.